UNITED STATES PATENT OFFICE.

REGINALD C. THOMAS AND ELENI D. THOMAS, OF NEW YORK, N. Y.

COSMETIC CREAM.

1,073,787.

Specification of Letters Patent. Patented Sept. 23, 1913.

No Drawing. Application filed May 17, 1911. Serial No. 627,724.

*To all whom it may concern:*

Be it known that we, REGINALD C. THOMAS and ELENI D. THOMAS, both citizens of the United States, and residents of the city of New York, borough of Brooklyn, in the county of Kings and State of New York, have invented a new and Improved Composition of Matter to be Used as a Cosmetic Cream, of which the following is a full, clear, and exact description.

Our invention relates to a new and improved cosmetic cream, and more particularly relates to that class of creams used for increasing the flow of blood through the capillary blood vessels within the derm to bring a flush to the surface of the skin and in general resembles a rubefacient.

An object of our invention is to prepare a colorless cream which will perform the function of a rouge, and which does not possess the disadvantages common to the ordinary face paints or rouges, such as sealing the pores of the skin.

A further object of our invention is to provide a smooth, readily absorbed cream, which will perform the above-outlined functions, but which will greatly eliminate the usual irritating qualities and stimulate the flow of blood through the blood vessels of the skin and produce a delicate blush on the surface of said skin.

As the basis of this cream, we make use of a marine micro-organism belonging to the genus *Halichondria*, found in the Mediterranean sea and known locally as "hishaf" or "hishaff" pulverized. This substance may be used alone by lightly rubbing the same on the skin, but we preferably use this hishaf in the form of a cream, to render the same smooth and agreeable of application, which cream is preferably formed of the following ingredients: stearic acid, 5 ounces by weight; glycerin, 20 ounces by measure; concentrated ammonia, 1 ounce by measure; hot water, 15 ounces by measure; borax, 1 dram by weight, to which is added the hishaf as follows: fair complexion cream, 3 ounces by measure; dark complexion cream, 4 ounces by measure. There may also be added to the above ingredients sufficient scenting essence to render the cream fragrant, preferably four eyedropperfuls of a composition of essential oils and floral products, known in the trade as oil of cactus. The above indicated amount of a normal strength ammonia has been found to be just sufficient to combine with the stearic acid present, and forms ammonium stearate. The stearic acid and glycerin are beaten together while subjected to a temperature of one hundred degrees centigrade, after which the concentrated ammonia is gradually added to saponify the stearic acid and glycerin. The hot water is mixed with the borax and added to the mixture,—the borax, to give a body to the cream, and the hot water to thin out the substance and to render the same easy of application.

While we prefer to employ the ingredients and the proportions thereof above stated, we may substitute the known equivalent for said ingredients of this composition, varying the proportions of said ingredients and in some cases omitting one or more of them, as specifically detailed in certain of the appended claims, without departing from the spirit of this invention.

Having thus described our invention, we claim as new and desire to secure by Letters Patent:

1. A cosmetic cream containing *Halichondria*.

2. A cosmetic cream comprising hishaf combined with a suitable excipient.

3. A cosmetic cream comprising *Halichondria* combined with a cosmetic cream to mellow the irritating properties of the *Halichondria*, substantially as described and for the purpose herein mentioned.

4. A cosmetic cream, comprising *Halichondria* and a saponaceous substance, substantially as described and for the purpose herein mentioned.

5. A cosmetic cream, comprising hishaf, ammonium stearate and glycerin, substantially as described and for the purpose herein mentioned.

6. A cosmetic cream, comprising *Halichondria*, ammonium stearate, glycerin and borax.

7. A cosmetic cream, consisting of *Halichondria*, ammonium stearate, glycerin, borax and a scenting substance.

8. The production of a cosmetic cream for use in stimulating the flow of blood to the skin, the process consisting of beating together stearic acid and glycerin while subjected to the action of heat at a temperature of one hundred degrees centigrade; adding sufficient concentrated ammonia to the mixture to combine with all of the stearic acid present; adding a hot solution of borax to the mixture of stearic acid, glycerin and ammonia while agitating the same, and finally adding a rubefacient and a scenting agent to the mixture, while the latter is subjected to heat and agitation.

In testimony whereof we have signed our names to this specification in the presence of two subscribing witnesses.

REGINALD C. THOMAS.
ELENI D. THOMAS.

Witnesses:
W. S. ORTON,
PHILIP D. ROLLHAUS.